United States Patent
Pereny et al.

(10) Patent No.: US 12,269,384 B2
(45) Date of Patent: Apr. 8, 2025

(54) SEAT SUPPORT

(71) Applicant: Lear Corporation, Southfield, MI (US)

(72) Inventors: Michelle A. Pereny, Farmington Hills, MI (US); Joseph A. Himmel, IV, Southfield, MI (US); Wu Pan Zagorski, Southfield, MI (US); Bradley C. Duncan, Harrison Township, MI (US); Caleb A. Abbey, Southfield, MI (US); Paul S. Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 92 days.

(21) Appl. No.: 17/218,663

(22) Filed: Mar. 31, 2021

(65) Prior Publication Data

US 2022/0314851 A1 Oct. 6, 2022

(51) Int. Cl.
*A47C 7/02* (2006.01)
*B29C 67/20* (2006.01)
*B60N 2/56* (2006.01)
*B60N 2/58* (2006.01)

(52) U.S. Cl.
CPC .......... *B60N 2/5891* (2013.01); *B60N 2/5635* (2013.01); *B60N 2/5657* (2013.01); *B60N 2/5685* (2013.01); *B60N 2/5833* (2013.01); *B60N 2/5866* (2013.01); *B60N 2/5883* (2013.01)

(58) Field of Classification Search
CPC ............ B60N 2/5891; B60N 2/7017; B60N 2/5833; B60N 2/5866; B60N 2/585; B60N 2/5858; B60N 2/5883; B60N 2/5685; B60N 2/5657; B60N 2/5642; B60N 2/58; B60N 2/914
See application file for complete search history.

(56) References Cited

U.S. PATENT DOCUMENTS

| | | | |
|---|---|---|---|
| 1,621,008 | A | 3/1927 | Anthony |
| 2,130,935 | A | 9/1938 | Thompson |
| 2,188,995 | A | 2/1940 | Avery et al. |
| 2,630,938 | A | 3/1953 | Howard |
| 2,630,968 | A | 3/1953 | Morris |
| 3,155,363 | A | 11/1964 | Lohr |
| 3,309,052 | A | 3/1967 | Bernard |
| 3,315,283 | A | 4/1967 | Larsen |
| 3,630,572 | A | 12/1971 | Homier |

(Continued)

FOREIGN PATENT DOCUMENTS

| | | |
|---|---|---|
| AU | 2006227668 A1 | 9/2006 |
| AU | 2003296088 B2 | 9/2008 |

(Continued)

OTHER PUBLICATIONS

Non-Final Office Action for U.S. Appl. No. 17/682,220, dated Dec. 7, 2022, 12 pages.
German Office Action with English translation for Application No. 10 2022 107 559.1, dated May 8, 2023, 12 pages.
Office Action for U.S. Appl. No. 17/682,220, dated Jul. 29, 2024, 12 pages.
U.S. Office Action for U.S. Appl. No. 17/682,220, dated May 1, 2024, 25 pages.

(Continued)

*Primary Examiner* — Shin H Kim
(74) *Attorney, Agent, or Firm* — Brooks Kushman P.C.

(57) ABSTRACT

A seat support is provided with a plurality of layers of a non-foam material to mount to a seat frame and to support an occupant upon the seat frame. The plurality of layers is stacked upon each other, and each of the plurality of stacked layers has a generally uniform thickness.

20 Claims, 4 Drawing Sheets

(56) References Cited

U.S. PATENT DOCUMENTS

| | | | |
|---|---|---|---|
| 3,689,620 A | 9/1972 | Miyazaki et al. | |
| 3,733,658 A | 5/1973 | Mitchell | |
| D239,147 S | 3/1976 | Karlsen | |
| 3,961,823 A | 6/1976 | Caudill, Jr. | |
| 4,031,579 A | 6/1977 | Larned | |
| 4,287,657 A | 9/1981 | Andre et al. | |
| 4,396,823 A | 8/1983 | Nihei et al. | |
| 4,476,594 A | 10/1984 | McLeod | |
| 4,663,211 A | 5/1987 | Kon | |
| 4,751,029 A | 6/1988 | Swanson | |
| 4,859,516 A | 8/1989 | Yamanaka et al. | |
| 4,860,402 A | 8/1989 | Dichtel | |
| 4,876,135 A | 10/1989 | McIntosh | |
| 4,881,997 A * | 11/1989 | Hatch | B29C 33/16 264/46.7 |
| 4,900,377 A | 2/1990 | Redford et al. | |
| 4,913,757 A | 4/1990 | Yamanaka et al. | |
| 4,933,224 A * | 6/1990 | Hatch | B29C 65/086 24/444 |
| 4,952,265 A | 8/1990 | Yamanaka et al. | |
| 4,953,770 A | 9/1990 | Bond, Sr. | |
| 5,003,664 A | 4/1991 | Wong | |
| 5,007,676 A | 4/1991 | Lien | |
| 5,016,941 A | 5/1991 | Yokota | |
| 5,092,381 A | 3/1992 | Feijin et al. | |
| 5,095,592 A | 3/1992 | Doerfling | |
| 5,313,034 A | 5/1994 | Grimm et al. | |
| 5,378,296 A | 1/1995 | Vesa | |
| 5,381,922 A | 1/1995 | Gladman et al. | |
| 5,405,178 A | 4/1995 | Weingartner et al. | |
| D364,269 S | 11/1995 | Sabosky | |
| 5,464,491 A | 11/1995 | Yamanaka | |
| 5,482,665 A | 1/1996 | Gill | |
| 5,492,662 A | 2/1996 | Kargol et al. | |
| 5,494,627 A | 2/1996 | Kargol et al. | |
| 5,551,755 A | 9/1996 | Lindberg | |
| 5,569,641 A | 10/1996 | Smith | |
| 5,586,807 A | 12/1996 | Taggart | |
| 5,587,121 A | 12/1996 | Vesa | |
| 5,620,759 A | 4/1997 | Insley et al. | |
| 5,622,262 A | 4/1997 | Sadow | |
| 5,639,543 A | 6/1997 | Isoda et al. | |
| 5,669,129 A | 9/1997 | Smith et al. | |
| 5,669,799 A | 9/1997 | Moseneder et al. | |
| 5,733,825 A | 3/1998 | Martin et al. | |
| 5,788,332 A | 8/1998 | Hettinga | |
| 5,811,186 A | 9/1998 | Martin et al. | |
| 5,819,408 A | 10/1998 | Catlin | |
| 5,833,321 A * | 11/1998 | Kim | B60N 2/58 297/452.45 |
| 5,966,783 A | 10/1999 | Genereux et al. | |
| 6,057,024 A | 5/2000 | Mleziva et al. | |
| 6,063,317 A | 5/2000 | Carroll, III | |
| 6,131,220 A | 10/2000 | Morimura | |
| 6,272,707 B1 | 8/2001 | Robrecht et al. | |
| 6,283,552 B1 | 9/2001 | Halse et al. | |
| 6,302,487 B1 | 10/2001 | Fujita et al. | |
| 6,347,790 B1 | 2/2002 | Nishibori et al. | |
| 6,378,150 B1 | 4/2002 | Minegishi et al. | |
| D461,746 S | 8/2002 | Olson et al. | |
| 6,457,218 B1 | 10/2002 | Lawrence | |
| 6,558,590 B1 | 5/2003 | Stewart | |
| 6,668,429 B2 | 12/2003 | Fujisawa et al. | |
| 6,766,201 B2 | 7/2004 | Von Arx et al. | |
| 6,776,201 B2 | 8/2004 | Willis | |
| 6,918,146 B2 | 7/2005 | England | |
| D523,330 S | 6/2006 | Mattesky | |
| 7,073,230 B2 | 7/2006 | Boville | |
| 7,100,978 B2 | 9/2006 | Ekern et al. | |
| D530,192 S | 10/2006 | Becerra | |
| 7,128,371 B2 * | 10/2006 | Kawasaki | B60N 2/7011 297/354.12 |
| 7,141,768 B2 * | 11/2006 | Malofsky | B29C 65/3644 428/458 |
| 7,158,968 B2 | 1/2007 | Cardno | |
| D538,704 S | 3/2007 | Kaminski | |
| 7,290,300 B1 | 11/2007 | Khambete | |
| 7,377,762 B2 | 5/2008 | Nishibori et al. | |
| 7,427,103 B2 | 9/2008 | Weber | |
| 7,481,489 B2 * | 1/2009 | Demick | B60N 2/5825 297/218.1 |
| 7,506,939 B2 | 3/2009 | Borckschneider et al. | |
| 7,547,061 B2 | 6/2009 | Horimatsu et al. | |
| 7,549,707 B2 * | 6/2009 | Brennan | A47C 7/74 297/180.14 |
| 7,622,179 B2 | 11/2009 | Patel | |
| 7,625,629 B2 | 12/2009 | Takaoka | |
| 7,669,925 B2 | 3/2010 | Beck et al. | |
| 7,707,743 B2 | 5/2010 | Schindler et al. | |
| 7,771,375 B2 | 8/2010 | Nishibori et al. | |
| 7,837,263 B2 * | 11/2010 | Booth | A47C 7/20 297/218.1 |
| 7,892,991 B2 | 2/2011 | Yamanaka et al. | |
| D636,293 S | 4/2011 | Dolce et al. | |
| 7,946,649 B2 | 5/2011 | Galbreath et al. | |
| 7,993,734 B2 | 8/2011 | Takaoka | |
| 8,052,212 B2 | 11/2011 | Backendorf | |
| 8,056,263 B2 | 11/2011 | Schindler et al. | |
| 8,226,882 B2 | 7/2012 | Takaoka | |
| 8,240,759 B2 * | 8/2012 | Hobl | B60N 2/5825 297/452.59 |
| 8,276,235 B2 | 10/2012 | Naughton | |
| 8,277,210 B2 | 10/2012 | Takaoka | |
| D677,193 S | 3/2013 | MacDonald | |
| 8,563,121 B2 | 10/2013 | Takaoka | |
| 8,563,123 B2 | 10/2013 | Takaoka | |
| 8,568,635 B2 | 10/2013 | Takaoka | |
| 8,721,825 B2 | 5/2014 | Takaoka | |
| 8,752,902 B2 | 6/2014 | Labish | |
| 8,757,996 B2 | 6/2014 | Takaoka | |
| 8,828,293 B2 | 9/2014 | Takaoka | |
| 8,882,202 B2 * | 11/2014 | Petzel | B29C 65/70 297/452.37 |
| 8,932,692 B2 | 1/2015 | Pearce | |
| 9,004,591 B2 | 4/2015 | Murasaki et al. | |
| 9,097,921 B2 | 8/2015 | Ogasawara et al. | |
| 9,168,854 B2 | 10/2015 | Ursino et al. | |
| 9,169,585 B2 | 10/2015 | Takaoka | |
| 9,174,404 B2 | 11/2015 | Takaoka | |
| 9,179,748 B2 | 11/2015 | Esti | |
| 9,194,066 B2 | 11/2015 | Takaoka | |
| 9,283,875 B1 | 3/2016 | Pellettiere | |
| 9,334,593 B2 | 5/2016 | Sasaki | |
| 9,434,286 B2 * | 9/2016 | Klusmeier | B29C 70/088 |
| 9,440,390 B2 | 9/2016 | Takaoka | |
| 9,447,522 B2 | 9/2016 | Zikeli et al. | |
| 9,456,702 B2 | 10/2016 | Miyata et al. | |
| 9,528,209 B2 | 12/2016 | Takaoka | |
| 9,561,612 B2 | 2/2017 | Takaoka | |
| 9,598,803 B2 | 3/2017 | Takaoka | |
| 9,615,670 B2 | 4/2017 | Takaoka | |
| 9,616,790 B2 | 4/2017 | Stankiewicz et al. | |
| 9,617,021 B2 | 4/2017 | McCorkle et al. | |
| 9,669,744 B2 | 6/2017 | Cao et al. | |
| 9,688,007 B2 | 6/2017 | Cheng | |
| 9,708,067 B2 | 7/2017 | Wilson et al. | |
| 9,751,442 B2 | 9/2017 | Smith | |
| 9,771,174 B2 | 9/2017 | Murray | |
| D798,875 S | 10/2017 | Huang | |
| 9,789,796 B1 * | 10/2017 | White | B60N 2/70 |
| 9,918,559 B2 | 3/2018 | Osaki | |
| 9,918,560 B2 | 3/2018 | Osaki | |
| 9,925,899 B2 | 3/2018 | Mogi et al. | |
| 9,938,649 B2 | 4/2018 | Taninaka et al. | |
| 9,970,140 B2 | 5/2018 | Taninaka et al. | |
| 10,118,323 B2 | 11/2018 | Fujita et al. | |
| 10,150,320 B2 | 12/2018 | Ellringmann et al. | |
| 10,231,511 B2 | 3/2019 | Guyan et al. | |
| 10,233,073 B2 | 3/2019 | Takaoka | |
| 10,266,977 B2 | 4/2019 | Takaoka | |
| 10,316,444 B2 | 6/2019 | Wakui et al. | |
| 10,328,618 B2 | 6/2019 | Takaoka | |
| 10,343,565 B2 | 7/2019 | Baek et al. | |

(56) References Cited

U.S. PATENT DOCUMENTS

| | | |
|---|---|---|
| 10,398,236 B2 | 9/2019 | Achten et al. |
| 10,399,848 B2 | 9/2019 | Kristo et al. |
| 10,414,305 B2 * | 9/2019 | Ishii .................... B60N 2/5866 |
| 10,421,414 B2 | 9/2019 | Townley et al. |
| 10,501,598 B2 | 12/2019 | Baldwin et al. |
| 10,604,040 B2 | 3/2020 | Clauser et al. |
| 10,618,799 B2 | 4/2020 | Shah et al. |
| 10,730,419 B2 | 8/2020 | Low et al. |
| 10,736,435 B2 | 8/2020 | Duncan et al. |
| 10,744,914 B2 | 8/2020 | Baek et al. |
| 10,750,820 B2 | 8/2020 | Guyan |
| RE48,225 E | 9/2020 | Kheil et al. |
| 10,780,805 B2 | 9/2020 | Kamata |
| 10,806,272 B2 | 10/2020 | Ando et al. |
| 10,821,862 B2 * | 11/2020 | Russman ............. B60N 2/5635 |
| 10,843,600 B2 * | 11/2020 | Booth .................... B32B 5/024 |
| 10,882,444 B2 | 1/2021 | Townley et al. |
| 10,889,071 B2 | 1/2021 | Kojima et al. |
| D909,792 S | 2/2021 | Pound |
| 10,934,644 B2 | 3/2021 | Taninaka et al. |
| 11,007,761 B2 | 5/2021 | Ben-Daat et al. |
| 11,168,421 B2 | 11/2021 | Wakui et al. |
| 11,186,336 B2 | 11/2021 | Primeaux et al. |
| D948,764 S | 4/2022 | Peterson |
| 11,369,532 B2 | 6/2022 | Wilson et al. |
| 11,383,625 B2 | 7/2022 | Voigt et al. |
| 11,554,699 B2 * | 1/2023 | Liau ......................... A47C 7/24 |
| D1,005,380 S | 11/2023 | McWilliams et al. |
| 2002/0101109 A1 | 8/2002 | Stiller et al. |
| 2002/0193221 A1 | 12/2002 | Tisi et al. |
| 2003/0026970 A1 | 2/2003 | Hernandez et al. |
| 2003/0032731 A1 | 2/2003 | Oswald et al. |
| 2003/0061663 A1 | 4/2003 | Lampel |
| 2003/0092335 A1 | 5/2003 | Takaoko |
| 2004/0036326 A1 | 2/2004 | Bajic et al. |
| 2004/0063450 A1 | 4/2004 | Uhlik |
| 2004/0099981 A1 | 5/2004 | Gerking |
| 2004/0126577 A1 | 7/2004 | Lee et al. |
| 2004/0142619 A1 | 7/2004 | Ueno et al. |
| 2004/0255385 A1 | 12/2004 | England |
| 2005/0030011 A1 | 2/2005 | Shimizu et al. |
| 2005/0066423 A1 | 3/2005 | Hogan |
| 2005/0198874 A1 | 9/2005 | Wurm |
| 2005/0238842 A1 * | 10/2005 | Schindzielorz .......... B60N 2/70 |
| | | 428/102 |
| 2006/0068120 A1 | 3/2006 | Sreenivasan et al. |
| 2006/0116045 A1 | 6/2006 | Nishibori et al. |
| 2006/0198983 A1 | 9/2006 | Patel |
| 2006/0200119 A1 | 9/2006 | Vaska et al. |
| 2006/0200120 A1 | 9/2006 | DiCarlo et al. |
| 2006/0237986 A1 | 10/2006 | Brockschneider et al. |
| 2007/0001336 A1 | 1/2007 | Nishibori et al. |
| 2007/0057414 A1 | 3/2007 | Hartge |
| 2007/0066197 A1 * | 3/2007 | Woo ....................... B24D 11/02 |
| | | 451/527 |
| 2007/0134464 A1 * | 6/2007 | Schindzielorz ........... B32B 5/26 |
| | | 428/86 |
| 2007/0207691 A1 | 9/2007 | Cobbett Wiles et al. |
| 2008/0099458 A1 * | 5/2008 | Hilmer ................. B60N 2/5685 |
| | | 219/217 |
| 2008/0102149 A1 | 5/2008 | Williams |
| 2008/0203615 A1 | 8/2008 | Brum |
| 2008/0252111 A1 * | 10/2008 | Rothkop ................. B60N 3/004 |
| | | 297/188.04 |
| 2008/0254281 A1 * | 10/2008 | Chen .................... B29C 51/004 |
| | | 428/335 |
| 2008/0309143 A1 * | 12/2008 | Booth ...................... B60N 2/58 |
| | | 297/452.56 |
| 2009/0008377 A1 * | 1/2009 | Nathan ................... B60N 2/002 |
| | | 219/217 |
| 2009/0108494 A1 | 4/2009 | Ito et al. |
| 2009/0152909 A1 * | 6/2009 | Andersson ............. B60N 2/565 |
| | | 297/180.13 |
| 2009/0269570 A1 | 10/2009 | Takaoka |
| 2009/0269571 A1 | 10/2009 | Takaoka |
| 2010/0181796 A1 | 7/2010 | Galbreath et al. |
| 2010/0258334 A1 * | 10/2010 | Akaike .................. H05K 1/038 |
| | | 174/126.1 |
| 2011/0252568 A1 | 10/2011 | Ramp |
| 2011/0278902 A1 | 11/2011 | Galbreath et al. |
| 2011/0316185 A1 | 12/2011 | Takaoka |
| 2012/0042452 A1 | 2/2012 | Takaoka |
| 2012/0104646 A1 | 5/2012 | Takaoka |
| 2012/0112515 A1 | 5/2012 | Labish |
| 2012/0180939 A1 | 7/2012 | Takaoka |
| 2012/0181841 A1 * | 7/2012 | Petzel ....................... B60N 2/90 |
| | | 297/452.48 |
| 2012/0301701 A1 | 11/2012 | Takaoka |
| 2012/0319323 A1 | 12/2012 | Takaoka |
| 2012/0328722 A1 | 12/2012 | Takaoka |
| 2013/0000043 A1 | 1/2013 | Bullard et al. |
| 2013/0020016 A1 | 1/2013 | Takaoka |
| 2013/0137330 A1 | 5/2013 | Grimm |
| 2013/0161858 A1 | 6/2013 | Sasaki |
| 2013/0164123 A1 * | 6/2013 | Helmenstein ....... F04D 29/4246 |
| | | 415/182.1 |
| 2013/0189472 A1 | 7/2013 | Takaoka |
| 2013/0200661 A1 * | 8/2013 | Klusmeier ........... B60N 2/5685 |
| | | 297/180.12 |
| 2014/0029900 A1 | 1/2014 | Logan, Jr. et al. |
| 2014/0035191 A1 | 2/2014 | Takaoka |
| 2014/0037907 A1 | 2/2014 | Takaoka |
| 2014/0037908 A1 | 2/2014 | Takaoka |
| 2014/0042792 A1 | 2/2014 | Kajiwara |
| 2014/0062161 A1 | 3/2014 | Elenbaas et al. |
| 2014/0138016 A1 | 5/2014 | Takaoka |
| 2014/0167328 A1 | 6/2014 | Petzel |
| 2014/0354029 A1 * | 12/2014 | Petzel .................. B60N 2/7017 |
| | | 297/452.48 |
| 2014/0370769 A1 | 12/2014 | Osaki |
| 2014/0378015 A1 | 12/2014 | Osaki |
| 2015/0072107 A1 * | 3/2015 | Fujita ...................... B32B 5/026 |
| | | 442/221 |
| 2015/0091209 A1 | 4/2015 | Mueller et al. |
| 2015/0197056 A1 | 7/2015 | Takaoka |
| 2015/0210192 A1 | 7/2015 | Benson et al. |
| 2015/0219136 A1 | 8/2015 | Koelling |
| 2015/0266263 A1 | 9/2015 | Ichikawa |
| 2015/0272332 A1 * | 10/2015 | Noguchi ................... B60N 2/64 |
| | | 264/138 |
| 2015/0274048 A1 | 10/2015 | Mogi et al. |
| 2015/0284894 A1 | 10/2015 | Takaoka |
| 2015/0367583 A1 | 12/2015 | Blot et al. |
| 2016/0009209 A1 | 1/2016 | Cao et al. |
| 2016/0010250 A1 | 1/2016 | Taninaka et al. |
| 2016/0023387 A1 | 1/2016 | Takaoka |
| 2016/0032506 A1 | 2/2016 | Takaoka |
| 2016/0051009 A1 | 2/2016 | Kormann et al. |
| 2016/0052433 A1 | 2/2016 | Ono et al. |
| 2016/0052435 A1 | 2/2016 | Nakada |
| 2016/0096462 A1 | 4/2016 | Kromm et al. |
| 2016/0122925 A1 | 5/2016 | Shah et al. |
| 2016/0144756 A1 | 5/2016 | Ito et al. |
| 2016/0157628 A1 | 6/2016 | Khambete et al. |
| 2016/0174725 A1 | 6/2016 | Takaoka |
| 2016/0263802 A1 | 9/2016 | Takaoka |
| 2016/0318428 A1 | 11/2016 | Hugues |
| 2016/0374428 A1 | 12/2016 | Kormann et al. |
| 2017/0043695 A1 | 2/2017 | Kitamoto et al. |
| 2017/0174346 A1 | 6/2017 | Wilson et al. |
| 2017/0181505 A1 | 6/2017 | Burke et al. |
| 2017/0184108 A1 | 6/2017 | Scancarello et al. |
| 2017/0332733 A1 | 11/2017 | Cluckers et al. |
| 2018/0054858 A1 * | 2/2018 | Dry .......................... B32B 27/08 |
| 2018/0070736 A1 | 3/2018 | Achten et al. |
| 2018/0086623 A1 | 3/2018 | Takaoka |
| 2018/0147792 A1 | 5/2018 | Kojima et al. |
| 2018/0229634 A1 | 8/2018 | Baisch et al. |
| 2018/0332663 A1 * | 11/2018 | Lisseman ............. B60N 2/5685 |
| 2019/0002272 A1 | 1/2019 | Kristo et al. |
| 2019/0090656 A1 | 3/2019 | Duncan et al. |
| 2019/0125092 A1 | 5/2019 | Ando et al. |
| 2019/0135199 A1 * | 5/2019 | Galan Garcia ........ B60K 35/00 |

(56) References Cited

U.S. PATENT DOCUMENTS

| | | | |
|---|---|---|---|
| 2019/0161593 A1 | 5/2019 | Hattori | |
| 2019/0232835 A1 | 8/2019 | Murakami | |
| 2019/0298072 A1 | 10/2019 | Bhatia et al. | |
| 2019/0344691 A1* | 11/2019 | Liau | B60N 2/5866 |
| 2019/0351787 A1 | 11/2019 | Lodhia et al. | |
| 2019/0357695 A1 | 11/2019 | Achten et al. | |
| 2019/0381955 A1* | 12/2019 | Mueller | B32B 5/06 |
| 2019/0390382 A1 | 12/2019 | Rong et al. | |
| 2020/0017006 A1* | 1/2020 | Booth | D02G 3/446 |
| 2020/0039399 A1* | 2/2020 | Oomen | B60N 2/5891 |
| 2020/0165122 A1* | 5/2020 | Salzmann | B32B 5/024 |
| 2020/0180479 A1* | 6/2020 | Russman | B60N 2/5657 |
| 2020/0231428 A1 | 7/2020 | Migneco et al. | |
| 2020/0262323 A1 | 8/2020 | Robinson et al. | |
| 2020/0332445 A1 | 10/2020 | Taninaka et al. | |
| 2020/0360210 A1 | 11/2020 | Zoni, III et al. | |
| 2021/0024155 A1 | 1/2021 | Primeaux et al. | |
| 2021/0046731 A1 | 2/2021 | Nishikawa et al. | |
| 2021/0054549 A1 | 2/2021 | Takaoka | |
| 2021/0074258 A1 | 3/2021 | Konno et al. | |
| 2021/0086670 A1* | 3/2021 | Kozlowski | B60N 2/5883 |
| 2021/0115607 A1 | 4/2021 | Inoue et al. | |
| 2021/0188138 A1* | 6/2021 | Powell | B60N 2/5657 |
| 2021/0221266 A1* | 7/2021 | Kozlowski | B32B 38/0004 |
| 2021/0291421 A1 | 9/2021 | Nattrass et al. | |
| 2021/0299995 A1 | 9/2021 | Sieradzki et al. | |
| 2022/0017003 A1* | 1/2022 | Carraro | B32B 7/14 |
| 2022/0017718 A1 | 1/2022 | Martin et al. | |
| 2022/0025561 A1 | 1/2022 | Yasui et al. | |
| 2022/0169554 A1 | 6/2022 | Du Moulinet D'Hardemare et al. | |
| 2022/0178057 A1 | 6/2022 | Maschino et al. | |
| 2022/0314851 A1 | 10/2022 | Pereny et al. | |
| 2022/0314854 A1 | 10/2022 | Pereny et al. | |
| 2022/0370749 A1 | 11/2022 | Dunn et al. | |
| 2022/0402416 A1 | 12/2022 | Yang et al. | |
| 2022/0410775 A1 | 12/2022 | Aoki et al. | |
| 2023/0028451 A1 | 1/2023 | Gastaldi | |
| 2023/0173964 A1 | 6/2023 | Webster et al. | |
| 2023/0191678 A1 | 6/2023 | Blair et al. | |
| 2023/0191680 A1 | 6/2023 | Blair et al. | |
| 2023/0322136 A1 | 10/2023 | Wang et al. | |

FOREIGN PATENT DOCUMENTS

| | | |
|---|---|---|
| BR | 112014004632 B1 | 4/2021 |
| BR | 112014001603 A2 | 8/2021 |
| BR | 112013020474 B1 | 9/2021 |
| BR | 112017016357 B1 | 3/2022 |
| CA | 3102262 A1 | 12/2019 |
| CN | 100467696 C | 3/2009 |
| CN | 1859862 B | 4/2010 |
| CN | 202509164 U | 10/2012 |
| CN | 104582538 B | 4/2015 |
| CN | 105026632 A | 11/2015 |
| CN | 102959151 B | 4/2016 |
| CN | 105612279 A | 5/2016 |
| CN | 103328711 B | 6/2016 |
| CN | 104024511 B | 8/2016 |
| CN | 106231959 B | 12/2016 |
| CN | 104080959 B | 2/2017 |
| CN | 106387295 A | 2/2017 |
| CN | 103998668 B | 3/2017 |
| CN | 103827376 B | 6/2017 |
| CN | 105683434 B | 7/2017 |
| CN | 104285003 B | 9/2017 |
| CN | 105705695 B | 1/2018 |
| CN | 207140883 U | 3/2018 |
| CN | 208484779 U | 2/2019 |
| CN | 109552123 A | 4/2019 |
| CN | 109680413 A | 4/2019 |
| CN | 110316033 A | 10/2019 |
| CN | 107614238 B | 2/2020 |
| CN | 107208339 B | 6/2020 |
| CN | 107532357 B | 8/2020 |
| CN | 111989430 A | 11/2020 |
| CN | 112020578 A | 12/2020 |
| CN | 107708493 B | 1/2021 |
| CN | 107208340 B | 2/2021 |
| CN | 109552123 B | 7/2021 |
| CN | 113166995 A | 7/2021 |
| CN | 213618701 U | 7/2021 |
| CN | 215203369 U | 12/2021 |
| CN | 113930900 A | 1/2022 |
| CN | 109680412 B | 2/2022 |
| CN | 115139881 A | 10/2022 |
| DE | 2626748 C3 | 10/1979 |
| DE | 3127303 A1 | 1/1983 |
| DE | 3037834 C2 | 5/1987 |
| DE | 3690196 C1 | 10/1989 |
| DE | 4214389 A1 | 11/1993 |
| DE | 102004053133 A1 | 5/2006 |
| DE | 202006017670 U1 | 7/2007 |
| DE | 102006020306 A1 | 11/2007 |
| DE | 102008033468 A | 2/2009 |
| DE | 112013005643 T5 | 8/2015 |
| DE | 202018104691 U1 | 11/2019 |
| DE | 112019002208 T5 | 1/2021 |
| DE | 102020210092 A1 | 3/2021 |
| DE | 102020127913 A1 | 6/2021 |
| DE | 102022107559 A | 10/2022 |
| DK | 1832675 T3 | 6/2013 |
| DK | 2772576 T3 | 5/2015 |
| DK | 3255192 T3 | 3/2020 |
| DK | 202370025 A1 | 2/2024 |
| DK | 202370426 A1 | 8/2024 |
| EP | 0145603 B1 | 4/1988 |
| EP | 0370991 A2 | 5/1990 |
| EP | 0392568 A1 | 10/1990 |
| EP | 0240388 A2 | 1/1991 |
| EP | 0805064 A2 | 11/1997 |
| EP | 0890430 A2 | 1/1999 |
| EP | 0926302 A2 | 6/1999 |
| EP | 0894885 B1 | 11/2002 |
| EP | 1586687 A1 | 10/2005 |
| EP | 1270787 B1 | 6/2010 |
| EP | 1858944 B1 | 7/2011 |
| EP | 2532502 A1 | 12/2012 |
| EP | 2565304 A1 | 3/2013 |
| EP | 1832675 B1 | 4/2013 |
| EP | 1683446 B1 | 7/2013 |
| EP | 2774807 A2 | 9/2014 |
| EP | 2489770 B1 | 1/2015 |
| EP | 2772576 B1 | 4/2015 |
| EP | 2230132 B1 | 5/2016 |
| EP | 2653598 B1 | 7/2016 |
| EP | 3210487 A1 | 8/2017 |
| EP | 2792776 B1 | 10/2017 |
| EP | 2792775 B1 | 11/2017 |
| EP | 2848721 B1 | 1/2018 |
| EP | 3305500 A1 | 4/2018 |
| EP | 2751312 B1 | 7/2018 |
| EP | 3064627 B1 | 8/2018 |
| EP | 3064628 B1 | 8/2018 |
| EP | 2894246 B1 | 10/2018 |
| EP | 2966206 B1 | 11/2018 |
| EP | 3256632 B1 | 3/2019 |
| EP | 3255192 B1 | 1/2020 |
| EP | 3779017 A1 | 2/2021 |
| EP | 3826820 A1 | 6/2021 |
| EP | 3889332 A1 | 10/2021 |
| EP | 3610760 B1 | 11/2021 |
| EP | 3974572 A1 | 3/2022 |
| ES | 2335962 A1 | 4/2010 |
| ES | 2335962 B1 | 4/2010 |
| ES | 2346180 T3 | 10/2010 |
| FR | 2432108 A1 | 2/1980 |
| FR | 2596626 A1 | 10/1987 |
| FR | 2675440 B1 | 12/1993 |
| FR | 2850260 A1 | 7/2004 |
| FR | 3050409 B1 | 10/2017 |
| FR | 3063461 B1 | 3/2019 |
| FR | 3109753 B1 | 11/2021 |
| GB | 721866 A | 1/1955 |
| GB | 1009799 A | 11/1965 |

(56) References Cited

FOREIGN PATENT DOCUMENTS

| | | |
|---|---|---|
| GB | 2275695 A | 9/1994 |
| GB | 2576141 A | 2/2020 |
| GB | 2577591 B | 4/2021 |
| GB | 2589497 B | 11/2021 |
| GB | 2628886 A | 10/2024 |
| IN | 201717042989 A | 3/2018 |
| IN | 336480 B | 5/2020 |
| IN | 202047045846 A | 10/2020 |
| IN | 351780 B | 11/2020 |
| IN | 382056 B | 11/2021 |
| IN | 202117027707 A | 11/2021 |
| JP | S556515 A | 1/1980 |
| JP | S5517527 A | 2/1980 |
| JP | H04286627 A | 10/1992 |
| JP | H0861414 A | 3/1996 |
| JP | H1046185 A | 2/1998 |
| JP | H115282 A | 1/1999 |
| JP | H11350326 A | 12/1999 |
| JP | 2000004993 A | 1/2000 |
| JP | 2001046185 A | 2/2001 |
| JP | 2001055719 A | 2/2001 |
| JP | 2001061612 A | 3/2001 |
| JP | 2001070106 A | 3/2001 |
| JP | 2001329631 A | 11/2001 |
| JP | 2002084894 A | 3/2002 |
| JP | 2002087879 A | 3/2002 |
| JP | 2002088636 A | 3/2002 |
| JP | 2003250667 A | 9/2003 |
| JP | 2003251089 A | 9/2003 |
| JP | 2003268668 A | 9/2003 |
| JP | 2004202858 A | 7/2004 |
| JP | 3686690 B2 | 8/2005 |
| JP | 3686692 B2 | 8/2005 |
| JP | 2006200120 A | 12/2005 |
| JP | 2006006924 A | 1/2006 |
| JP | 2006200117 A | 8/2006 |
| JP | 2006200119 A | 8/2006 |
| JP | 2007098013 A | 4/2007 |
| JP | 2009090089 A | 1/2008 |
| JP | 4181878 B2 | 11/2008 |
| JP | 4350285 B2 | 10/2009 |
| JP | 4350286 B2 | 10/2009 |
| JP | 4350287 B2 | 10/2009 |
| JP | 2011045424 A | 3/2011 |
| JP | 2011152779 A | 8/2011 |
| JP | 2011177413 A | 9/2011 |
| JP | 2013091862 A | 10/2011 |
| JP | 4835150 B2 | 12/2011 |
| JP | 4907991 B2 | 4/2012 |
| JP | 2012115515 A | 6/2012 |
| JP | 5165809 B1 | 3/2013 |
| JP | 5339107 B1 | 11/2013 |
| JP | 5418741 B1 | 2/2014 |
| JP | 2014038151 A | 2/2014 |
| JP | 5454733 B1 | 3/2014 |
| JP | 5454734 B1 | 3/2014 |
| JP | 2014064767 A | 4/2014 |
| JP | 5532178 B1 | 6/2014 |
| JP | 5532179 B1 | 6/2014 |
| JP | 2014104050 A | 6/2014 |
| JP | 5569641 B1 | 8/2014 |
| JP | 2015205611 A | 11/2015 |
| JP | 5868964 B2 | 2/2016 |
| JP | 2016028900 A | 3/2016 |
| JP | 2016036972 A | 3/2016 |
| JP | 5909581 B1 | 4/2016 |
| JP | 5976511 B2 | 8/2016 |
| JP | 5986584 B2 | 9/2016 |
| JP | 5990194 B2 | 9/2016 |
| JP | 2016189879 A | 11/2016 |
| JP | 6182249 B2 | 8/2017 |
| JP | 2017150100 A | 8/2017 |
| JP | 6228278 B2 | 11/2017 |
| JP | 6294140 B2 | 3/2018 |
| JP | WO2016189879 A1 | 3/2018 |
| JP | 6311918 B2 | 4/2018 |
| JP | 6311919 B2 | 4/2018 |
| JP | 6318643 B2 | 5/2018 |
| JP | 6347492 B2 | 6/2018 |
| JP | 2020127523 A | 2/2019 |
| JP | 6527602 B2 | 6/2019 |
| JP | 6566900 B2 | 8/2019 |
| JP | 2019173217 A | 10/2019 |
| JP | 2019173218 A | 10/2019 |
| JP | 2019189972 A | 10/2019 |
| JP | 2019210565 A | 12/2019 |
| JP | 6661666 B2 | 3/2020 |
| JP | 2020045589 A | 3/2020 |
| JP | 2020090648 A | 6/2020 |
| JP | 6725823 B2 | 7/2020 |
| JP | 2020156629 A | 10/2020 |
| JP | 6786500 B2 | 11/2020 |
| JP | 6819297 B2 | 1/2021 |
| JP | 2021045365 A | 3/2021 |
| JP | 6863537 B2 | 4/2021 |
| JP | 6909823 B2 | 7/2021 |
| JP | WO2020090648 A1 | 10/2021 |
| JP | 7002010 B2 | 2/2022 |
| JP | 7158968 B2 | 10/2022 |
| KR | 200207612 Y1 | 1/2001 |
| KR | 101141773 B1 | 5/2012 |
| KR | 101250622 B1 | 4/2013 |
| KR | 20130067823 A | 6/2013 |
| KR | 20170017488 A | 2/2017 |
| KR | 101717488 B1 | 3/2017 |
| KR | 101722929 B1 | 4/2017 |
| KR | 101722932 B1 | 4/2017 |
| KR | 20170107554 A | 9/2017 |
| KR | 20170117085 A | 10/2017 |
| KR | 101829235 B1 | 2/2018 |
| KR | 101928730 B1 | 3/2019 |
| KR | 101961514 B1 | 3/2019 |
| KR | 101983204 B1 | 5/2019 |
| KR | 102002393 B1 | 7/2019 |
| KR | 102083055 B1 | 2/2020 |
| KR | 102137446 B1 | 7/2020 |
| KR | 102148214 B1 | 8/2020 |
| KR | 102227060 B1 | 3/2021 |
| KR | 20210076130 A | 6/2021 |
| NL | 1032699 C2 | 4/2008 |
| WO | 1992018224 A1 | 10/1992 |
| WO | 1995015768 A1 | 6/1995 |
| WO | 1997002377 A1 | 1/1997 |
| WO | 2000047801 A1 | 8/2000 |
| WO | 2000071382 A1 | 11/2000 |
| WO | 01068967 A1 | 9/2001 |
| WO | 2002061217 A1 | 8/2002 |
| WO | 2004014690 A1 | 2/2004 |
| WO | 2004063450 A1 | 7/2004 |
| WO | 2005030011 A1 | 4/2005 |
| WO | 2006068120 A1 | 6/2006 |
| WO | 2009092153 A1 | 7/2009 |
| WO | 2010068854 A1 | 6/2010 |
| WO | 2010090093 A1 | 8/2010 |
| WO | 2011102951 A1 | 8/2011 |
| WO | 2012035736 A1 | 3/2012 |
| WO | 2012157289 A1 | 11/2012 |
| WO | 2013030400 A1 | 3/2013 |
| WO | 2013088736 A1 | 6/2013 |
| WO | 2013088737 A1 | 6/2013 |
| WO | 2013168699 A1 | 11/2013 |
| WO | 2014038151 A1 | 3/2014 |
| WO | 2014080614 A1 | 5/2014 |
| WO | 2014132484 A1 | 9/2014 |
| WO | 2015050134 A1 | 4/2015 |
| WO | 2015064523 A1 | 5/2015 |
| WO | 2015064557 A1 | 5/2015 |
| WO | 2015163188 A1 | 10/2015 |
| WO | 2016125766 A1 | 8/2016 |
| WO | 2016130602 A1 | 8/2016 |
| WO | 2016177425 A1 | 11/2016 |
| WO | 2016189879 A1 | 12/2016 |
| WO | 2017119157 A1 | 7/2017 |
| WO | 2017122370 A1 | 7/2017 |

(56) References Cited

FOREIGN PATENT DOCUMENTS

| | | | |
|---|---|---|---|
| WO | 2017199474 | A1 | 11/2017 |
| WO | 2018068451 | A1 | 4/2018 |
| WO | 2019036559 | A1 | 2/2019 |
| WO | 2019188090 | A1 | 10/2019 |
| WO | 2019230304 | A1 | 12/2019 |
| WO | 2020021263 | A1 | 1/2020 |
| WO | 2020045589 | A1 | 3/2020 |
| WO | 2020090648 | A1 | 5/2020 |
| WO | 2020111110 | A1 | 6/2020 |
| WO | 2020116327 | A1 | 6/2020 |
| WO | 2020245670 | A1 | 12/2020 |
| WO | 2021074601 | A1 | 4/2021 |
| WO | 2021122937 | A1 | 6/2021 |
| WO | 2021141601 | A1 | 7/2021 |
| WO | 2022097435 | A1 | 5/2022 |
| WO | 2023101995 | A2 | 6/2023 |
| WO | 2023122018 | A2 | 6/2023 |
| WO | 2023172483 | A1 | 9/2023 |
| WO | 2023220261 | A1 | 11/2023 |
| WO | 2023244721 | A1 | 12/2023 |
| WO | 2023250026 | A1 | 12/2023 |
| WO | 2024006134 | A1 | 1/2024 |
| WO | 2024006143 | A1 | 1/2024 |
| WO | 2024097012 | A1 | 5/2024 |
| WO | 2024136943 | A1 | 6/2024 |

OTHER PUBLICATIONS

China Office Action and English translation for Application No. 202210303025.3, dated Nov. 8, 2023, 6 pages.
China Office Action with English translation for Application No. 202210303025.3, dated May 25, 2024, 24 pages.
Non-Final Office Action for U.S. Appl. No. 17/682,220, dated Oct. 23, 2023, 11 pages.
https://www.toyobo-global.com/seihin/breathair_youto_htm, Toyobo Breathair, Cushion Materials, 1996-2013, 3 pages.
https://www.youtube.com/watch2v=eFiPBu_fBe4, The Making of a Newton Wovenaire Crib Mattress, Apr. 21, 2016, 3 pages.
http://airstring.com, Introducing Airstring The Future of Cushioning, 2016, 13 pages.
Airstring.com, About Airstring, Jan. 18, 2021, 13 pages.
www.newtonbaby.com/pages/design, Born in water, designed to breathe, Jan. 28, 2021, 11 pages.
https://www.toyobo-global.com/seihin/breathair/breathair_youto.htm, Applications, Sep. 10, 2019, 5 pages.
https://www.youtube.com/watch?v=eFiPBu_fBe4, The Making of a Newton Wovenaire Crib Mattress—YouTube, 3 pages, Apr. 21, 2016.
China Office Action with English translation for Application No. 202210303025.3, dated Nov. 9, 2024, 20 pages.
German Office Action with English translation for Application No. 10 2021129112.7, dated Dec. 19, 2024, 12 pages.

* cited by examiner

SEAT SUPPORT

TECHNICAL FIELD

Various embodiments relate to seat supports, methods for manufacturing seat supports and seat assemblies, and methods for recycling seat supports and seat assemblies.

BACKGROUND

Duncan et al. U.S. Pat. No. 10,736,435 B2 issued on Aug. 11, 2020 to Lear Corporation teaches a seat part that includes a non-foam base material.

SUMMARY

According to an embodiment, a seat support is provided with a plurality of layers of a non-foam material to mount to a seat frame and to support an occupant upon the seat frame. The plurality of layers is stacked upon each other, and each of the plurality of stacked layers has a generally uniform thickness.

According to a further embodiment, one of the plurality of layers has a first firmness. Another of the plurality of layers has a second firmness that differs from the first firmness.

According to another further embodiment, one of the plurality of layers has a first thickness. Another of the plurality of layers has a second thickness that differs from the first thickness.

According to another further embodiment, wherein a plurality of zones is provided. At least two of the zones vary in thickness, firmness, or a quantity of stacked layers.

According to an even further embodiment, the plurality of zones is further provided with a nose, an insert, and a pair of bolsters on opposed lateral sides of the nose and the insert to support a seat bottom.

According to another even further embodiment, the plurality of zones is further provided with an insert, a pair of bolsters on opposed lateral sides of the insert, and a pair of shoulders on opposed lateral sides of the insert to support a seat back.

According to another further embodiment, each of the plurality of layers is formed from a monofilament textile material.

According to another further embodiment, each of the plurality of layers is formed from a recycled material.

According to another further embodiment, each of the plurality of layers is formed from polyester.

According to another even further embodiment, a heater mat or a blower is provided.

According to an even further embodiment, a sealed ventilation port is formed through at least one of the layers.

According to another even further embodiment, a region between a sequential pair of layers is sealed so that ventilation is directed through one of the sequential pair of layers.

According to another further embodiment, a conductive yarn is provided within the one of the layers of monofilament textile material.

According to another even further embodiment, a heater mat is oriented between two of the plurality of layers. The heater mat is in electrical communication with the conductive yarn.

According to another further embodiment, each sequential pair of layers are welded or sewn together.

According to another further embodiment, each layer is further provided with one of a hook and loop fastener to fasten to a sequential layer of the plurality of layers.

According to another further embodiment, each of the plurality of layers is formed from a similar recyclable material.

According to an even further embodiment, an adhesive is provided between each sequential pair of the plurality of layers to adhere sequential layers together. The adhesive is formed from the similar recyclable material.

According to another embodiment, a seat assembly is provided with a substrate. A seat support is provided with a plurality of layers of a non-foam material to mount to a seat frame and to support an occupant upon the seat frame. The plurality of layers is stacked upon each other, and each of the plurality of stacked layers has a generally uniform thickness. Each of the plurality of layers is formed from a monofilament textile material. The seat support is attached to the substrate.

According to a further embodiment, a seat frame is provided. The substrate is attached to the seat frame.

According to another further embodiment, each of the plurality of layers is formed from a similar recyclable material. The substrate is formed from the similar recyclable material.

According to another embodiment, a seat assembly is provided with a seat support with a plurality of layers of a non-foam material to mount to a seat frame and to support an occupant upon the seat frame. The plurality of layers is stacked upon each other, and each of the plurality of stacked layers has a generally uniform thickness. Each of the plurality of layers is formed from a monofilament textile material. Each of the plurality of layers is formed from a similar recyclable material. A trim cover is sized to receive the seat support.

According to a further embodiment, the trim cover is formed from the similar recyclable material as the plurality of layers.

According to another further embodiment, the trim cover is formed from a single leather layer without coatings.

According to another further embodiment, a trim clip is provided to connect the trim cover to the seat support. The trim clip is formed from the similar recyclable material as the plurality of layers.

According to another embodiment, a method for manufacturing a seat assembly cuts a first seat support portion from a first sheet of monofilament material. The first seat support portion is installed upon a substrate. A trim cover is installed over the first seat support portion.

According to a further embodiment, the sheet of monofilament material is unrolled before cutting the first seat support portion.

According to another further embodiment, the first seat support portion is cut with a laser.

According to another further embodiment, a plurality of seat support portions is cut from the first sheet of monofilament material. The plurality of seat support portions is stacked to form a seat support.

According to an even further embodiment, one of the plurality of seat support portions is sealed to direct ventilation through the seat assembly.

According to another even further embodiment, a dust is formed through one of the plurality of seat support portions to direct ventilation through the seat assembly.

According to another even further embodiment, the plurality of seat support portions is fastened together.

According to another further embodiment, a second seat support portion is cut from a second sheet of monofilament material that differs from the first sheet of monofilament material in firmness or thickness. The first seat support portion and the second seat support portion are stacked to form a seat support.

According to another further embodiment, a first plurality of seat support portions is cut from the first sheet of monofilament material. A second plurality of seat support portions is cut from a second sheet of monofilament material. The first plurality of seat support portions and the second plurality of seat support portions are stacked in zones to form a seat support.

According to another further embodiment, a polymeric material is recycled. The first sheet of monofilament material is manufactured from the recycled polymeric material.

According to an even further embodiment, the substrate is manufactured from the recycled polymeric material.

According to another even further embodiment, the trim cover is manufactured from the recycled polymeric material.

According to another even further embodiment, a plurality of seat support portions is adhered together with an adhesive of the recycled polymeric material.

According to another embodiment, a seat support assembly is provided with a non-foam monofilament textile material to mount to a seat frame and to support an occupant upon the seat frame. A heater mat or a blower is provided. The monofilament textile material permits ventilation without an air distribution bag.

According to a further embodiment, a sealed ventilation port is formed through the monofilament textile material.

According to another further embodiment, a region through the monofilament textile material is sealed so that ventilation is directed through the monofilament textile material.

According to another embodiment, a method for recycling a seat assembly a seat support from a polymeric material is ground. A trim clip or a trim cover from a similar polymeric material as the seat support is ground without disassembling the trim clip or the trim cover from the seat support.

According to a further embodiment, the trim clip and the trim cover from the similar polymeric material as the seat support are ground without disassembling the trim clip or the trim cover from the seat support.

According to another further embodiment, a substrate from a similar polymeric material as the seat support is ground without disassembling the substrate from the seat support.

According to another further embodiment, an adhesive from a similar polymeric material as the seat support is ground without removing the adhesive from the seat support.

According to another further embodiment, a roll of a monofilament material is manufactured from the ground polymeric material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Seat assemblies, and vehicle seat assemblies are designed and manufactured in light of various specifications, including support, comfort, performance, heating, ventilation, cooling, adjustability, and the like. Seat assemblies are often provided with a frame, and various layers of foam with varying densities to accommodate an applicable load distribution across the seat assembly.

Figure 1:
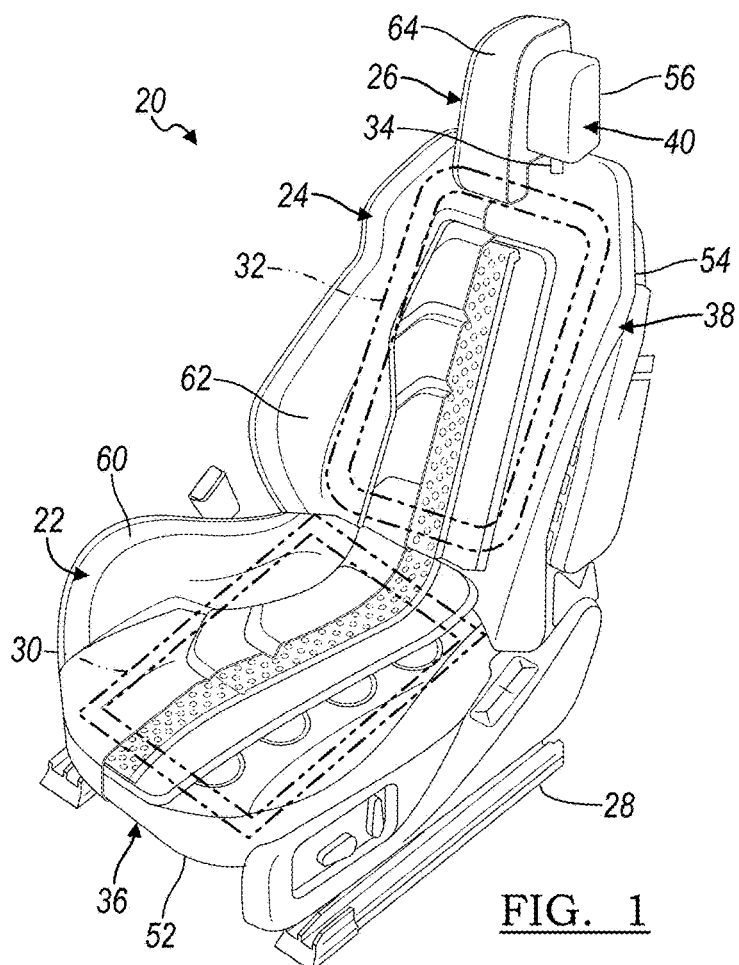
FIG. 1 is a perspective partial section view of a seat assembly according to an embodiment.

FIG. 1 illustrates a seat assembly 20 according to an embodiment. The seat assembly 20 is depicted as a vehicle seat, which may be employed as a seat assembly in a land vehicle, an aircraft, a watercraft, or the like. The seat assembly 20 may be employed within any row within the vehicle. Alternatively, the seat assembly 20 may also be employed as an office chair, or any individual chair. The seat assembly 20 omits traditional foam, in order to improve support and comfort, while reducing costs, material and size. The seat assembly 20 also employs recycled materials, which are manufactured for further recycling at the end of use of the seat assembly 20.

The seat assembly 20 includes a seat bottom 22, which is sized to receive a seated occupant to support a pelvis and thighs of the occupant. The seat assembly 20 also includes a seat back 24 sized to extend upright from the seat bottom 22 to support a back of the occupant. A head restraint 26 is supported upon and above the seat back 24 to support a head of the occupant. The seat bottom 22 is adapted to be supported by an underlying support surface. For the depicted embodiment, the seat assembly 20 includes a pair of rails 28 for mounting the seat bottom 22 to a vehicle floor for fore and aft adjustment relative to the vehicle floor. The seat back 24 may also be adjustable for recline relative to the seat bottom 22. The head restraint 26 may also be adjustable in height, tilt, and fore/aft directions. Other adjustments may be provided, as are known in the art.

The seat bottom 22 includes a frame 30 for providing rigid structural support to the seat bottom 22. The seat back 24 also includes a frame 32. The seat back frame 32 may be connected to the seat bottom frame 30 to extend upright from the seat bottom 22. The seat back frame 32 provides rigid structural support to seat back 24. The frame 30, 32 may be formed from a stamped steel alloy, a fiber reinforced polymer, or any suitable structural material. A pair of head restraint posts 34 are connected an upper region of the seat back frame 32 to support the head restraint 26 above the seat back 24.

Conventional seating assemblies include a plurality of foam layers to collectively provide cushioning upon the frames 30, 32 and the head restraint 26 upon the posts 34. The foam layers vary in density to provide compliant support to the occupant while distributing forces from the occupant to the frames 30, 32 and the posts 34. The foam layers also provide comfort to the occupant. The foam layers are often molded, thereby requiring dedicated tooling for each foam layer of each seating assembly.

The seat assembly 20 is formed without foam to improve comfort, performance, compactness, and recycling, while reducing manufacturing tooling costs. For example, the seat assembly 20 includes a seat bottom support 36, which provides the seat bottom cushion for the seat bottom 22. The seat bottom support 36 is formed from a plurality of stacked layers of a non-foam material. The seat back 24 includes a seat back support 38 that is also formed of the non-foam stacked layers. Likewise, the head restraint 26 may also be provided with a head restraint support 40 formed from the non-foam stacked layers.

Figure 2:
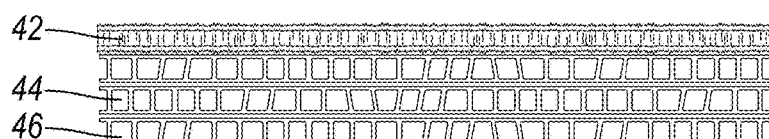
FIG. 2 is a perspective section view of a portion of the seat assembly of FIG. 1 according to another embodiment.

FIG. 2 illustrates a plurality of the stacked layers 42, 44, 46 that are employed to construct the seat bottom support 36, the seat back support 38 and the head restraint support 40. Each of the layers 42, 44, 46 depicted is formed from a knitted monofilament textile material. An example of the material is a polyester, such as polyethylene terephthalate. The material may also be formed from a recycled material to reduce material costs, and to reduce waste. The material of each of the layers 42, 44, 46 is a similar polyester, so that the entire seat support 36, 38, 40 can be recycled without disassembly of the individual layers 42, 44, 46.

The material is knitted or woven to provide structure, while also spaced out to provide porosity, ventilation, and compliancy. The layers 42, 44, 46 each may have a uniform thickness, and may be formed from sheets, or rolled sheets of material. The layers 42, 44, 46 may each vary by firmness or thickness. An example of a knitted non-foam material is disclosed in Duncan et al. U.S. Pat. No. 10,736,435 B2, which issued to Lear Corporation on Aug. 11, 2020, and is incorporated in its entirety by reference herein.

The layers 42, 44, 46 may be customizable. The layers 42, 44, 46 may each be formed from a specific firmness and thickness, so that varying combinations of the layers 42, 44, 46 can be employed to optimize a specified support and comfort curve profile for a variety of seats. The firmness of a layer 42, 44, 46 can be modified by modifying a density of the layer, density of the threads in the layer, thickness of the threads in the layer, spacing of the threads in the layer, and the like. Comfort curve profiles are developed by estimated pressure distributions across the seat assembly 20 based on set design characteristics for occupants based on predicted heights, weights, and other data for a target range of occupants. Seat assemblies 20 that utilize stacked layers 42, 44, 46 instead of polyurethane foam and that are designed to provide the same static comfort reduce up to two pounds in weight in comparison to the same seat assembly made with foam. Additionally, the stacked layers 42, 44, 46 permit more design flexibility to reduce pressure in peak areas in the seat assembly 20.

A range of varying thicknesses may be provided by the layers 42, 44, 46, 48 that can be combined for the target thickness of the seat supports 36, 38, 40. According to one example, each layer may have a thickness within a range of six to fifteen millimeters.

Figure 3:
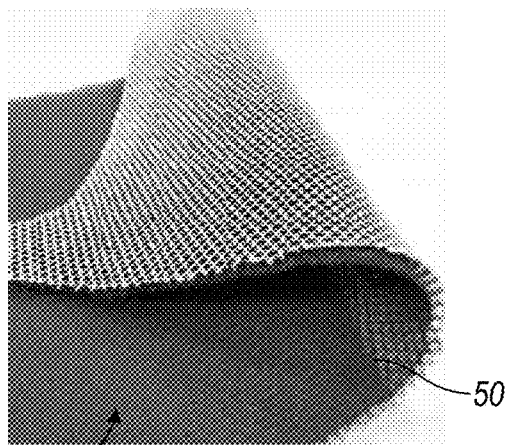
FIG. 3 is a perspective view of a portion of the seat assembly of FIG. 1 according to another embodiment.

FIG. 3 illustrates another non-foam monofilament textile that provides one of the layers 48. The textile is formed as a rolled good. The layers 42, 44, 46, 48 may each vary in knit pattern. For example, the layers 42, 44, 46, 48 may be formed with concealed surfaces, known as B surfaces in the art. Some layers may be formed with a surface designed to be exposed, known as a face cloth, or an A surface, such as the face cloth surface 50 of the layer 48 in FIG. 3. By providing the face cloth surface 50 on one of the layers, an external trim cover may be minimized or eliminated.

Each seat support 36, 38, 40 is formed from a plurality of the stacked layers 42, 44, 46, 48. The layers 42, 44, 46, 48 may each be unrolled, and then cut to a specified trim pattern. According to an embodiment, the layers 42, 44, 46, 48 are cut by a laser. According to another embodiment, the layers are cut by automation, such as robotic tooling. By cutting the layers 42, 44, 46, 48, trim dies and foam molds are eliminated, thereby reducing the tooling costs for manufacturing the seat assemblies 20.

The layers 42, 44, 46, 48 are then stacked together to form the seat supports 36, 38, 40. Referring again to FIG. 1, the seat bottom frame 30 may be formed as a pan. Each of the layers 42, 44, 46, 48 can be stacked and nested into a pan-shaped frame 30. Alternatively, a substrate, such as a carrier or pan 52 can be provided in the seat bottom 22 to receive the layers 42, 44, 46, 48, and to connect the layers to the frame 30. Likewise, the seat back frame 32 can also be formed as a pan. A seat back carrier 54 may be provided separately to support and attach the layers 42, 44, 46, 48 to the frame 30. A head restraint carrier 56 may also be provided to support the layers 42, 44, 46, 48, and to attach the layers 42, 44, 46, 48 to the posts 34.

Figure 4:
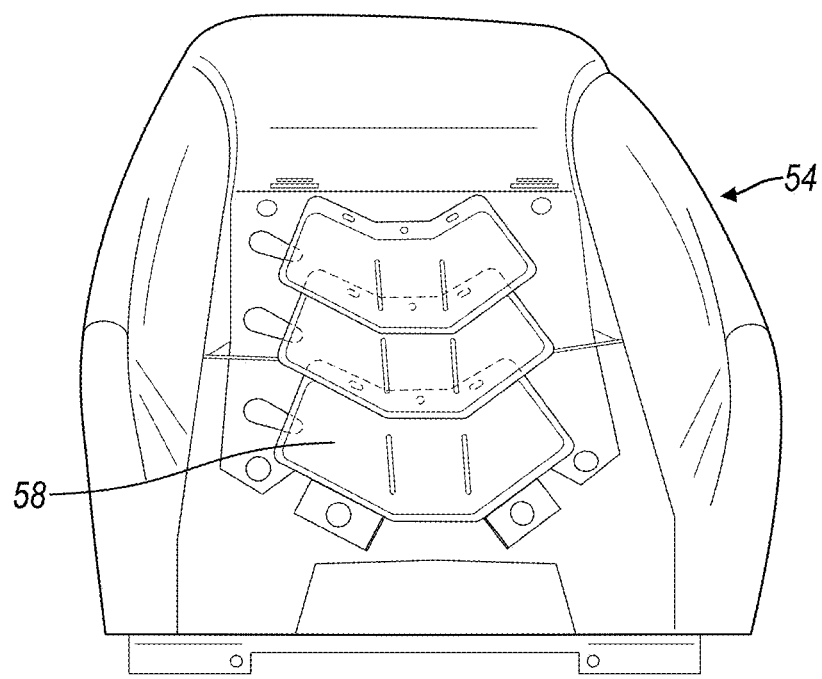
FIG. 4 is a perspective view of a portion of a seat assembly according to an embodiment.

FIG. 4 illustrates the seat back carrier 54 according to an embodiment. The seat back carrier 54 has a general overall shape and contour of the seat back 24. The seat back carrier 54 may also be provided with other functional components that are placed beneath the cushioning of the seat back support 38. For example, a plurality of air bladders 58 are attached to the carrier 54. The air bladders 58 may be employed for support, posture, and comfort adjustment to the seat back 24.

Each of the layers 42, 44, 46, 48 can be stacked and nested into each of the carriers 52, 54, 56 to build each of the seat supports 36, 38, 40. Each of the carriers 52, 54, 56 may also be formed of the same polyester material as the layers 42, 44, 46, 48. Therefore, the seat supports 36, 38, 40 can be recycled at the end of use without disassembling the layers 42, 44, 46, 48 from the carriers 52, 54, 56.

Each of the layers 42, 44, 46, 48 may be fastened together to form each seat support 36, 38, 40. According to one embodiment, a polyester adhesive is provided between adjacent layers 42, 44, 46, 48 to adhere the layers together 42, 44, 46, 48. The polyester adhesive can be recycled with the layers 42, 44, 46, 48 without removal before recycling. The polyester adhesive may be heat activated, wherein the assembled layers 42, 44, 46, 48 are heated to bond together. Polyester adhesive is less susceptible to deterioration over time, and from being subjected to variations in temperature and humidity. The polyester adhesive may be knitted into external threads of the layers 42, 44, 46, 48 according to an example.

Alternatively, the layers 42, 44, 46, 48 can be welded together, such as by a radiofrequency weld. The fastening of the layers 42, 44, 46, 48 by welding can also be automated. Other mechanisms for fastening adjacent layers includes, sewing, embroidery, quilting and the like. Sequential layers 42, 44, 46, 48 can be provided with a one of a hook and loop fastener to connect to each other.

Figure 5:
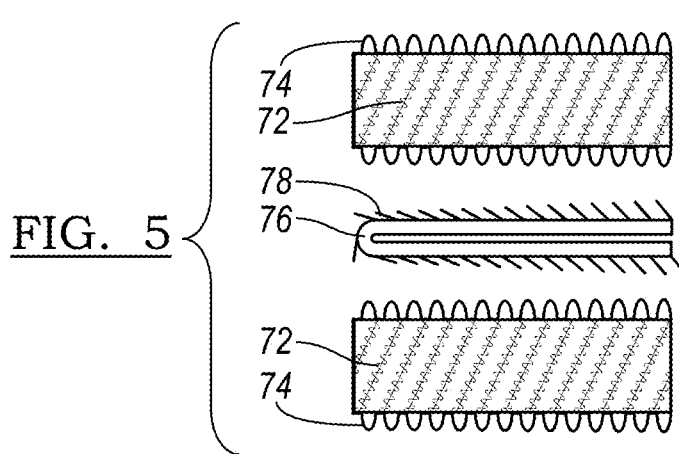
FIG. 5 is an exploded section view of a fastener assembly of a seat assembly according to another embodiment.

FIG. 5 illustrates two layers 72 each formed with a loop fastener 74 formed about the layers 72. An intermediate hook layer 76 is provided with an array of external hooks 78 to fasten to the loops 74 of the sequentially adjacent layers 72. Each of the layers 72, 76, and the fasteners 74, 78 are formed from polyester for recycling with the seat support 36, 38, 40.

Referring again to FIG. 1, once the stacked layers 42, 44, 46, 48 are assembled, the seat supports 36, 38, 40 are provided on the carriers 52, 54, 56. A trim cover 60, 62, 64 is provided over each seat support 36, 38, 40. The seat bottom trim cover 60, the seat back trim cover 62, and the head restraint trim cover 64 may each be formed from the polyester material. Therefore, the trim covers 60, 62, 64 can be recycled with the seat supports 36, 38, 40 without being removed from the seat supports 36, 38, 40. The trim covers 60, 62, 64 may be formed from sustainable materials, such as reprieve yarns, polyester based textiles, or leather alternatives.

Alternatively, the trim covers 60, 62, 64 can be formed from leather. The leather trim covers 60, 62, 64 may each be formed from a single material base without coatings to allow for end of use recycling. The leather trim covers 60, 62, 64 may be removed from the seat supports 36, 38, 40 for recycling separate from the seat supports 36, 38, 40.

Figure 6:
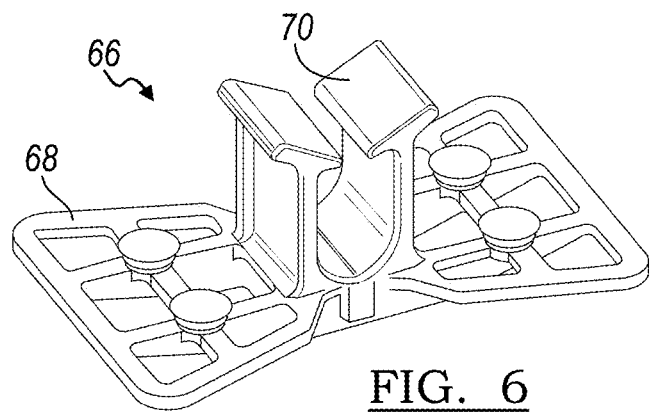
FIG. 6 is a perspective view of a trim clip of a seat assembly according to an embodiment.

FIG. 6 illustrates a trim clip 66 according to an embodiment. The trim clip 66 may function as is known in the art, with a base 68 that is sized to be received in a trench within one of the seat supports 36, 38, 40. The trim clip 66 also includes a pair of retainers 70 extending from the base 68. The retainers 70 receive a portion of the trim cover 60, 62, 64 to attach the trim cover 60, 62, 64 to the seat support 36, 38, 40. Although one trim clip 66 example is illustrated and described, any suitable trim clip may be employed. Multiple trim clips 66 may be employed, and may be interconnected, or tethered in arrays or strips known as ganged clips 66. The trim clips 66 may also be formed from the similar recyclable material, polyester. If tethered, then the tethers may also be formed from polyester. Due to the similar material, the trim clips 66 can be recycled with the seat supports 36, 38, 40 without being disassembled from the seat supports 36, 38, 40.

The various components for the seat assemblies 20 can be formed from a recycled material to reduce a carbon footprint. Additionally, at the end of the life, the seat supports 36, 38, 40 can be disassembled from the frames 30, 32, and posts 34 for recycling. For recycling, the polyester components can be ground together without disassembly. The recycled material can be repurposed. The recycled material may also be fabricated into rolls of monofilament textile material for fabricating new seat assemblies 20.

By eliminating foam from the seat assembly 20, molds and dies can be eliminated thereby reducing tooling costs. The flexibility of laser cutting lowers maintenance costs and increases part quality. The recyclability of the materials reduces scrap waste. Additionally, chemical usage is reduced in the manufacturing process.

The seat assembly 20 is lighter than a comparable seat fabricated with foam cushioning. The seat assembly 20 is also more compact in size. Targeted comfort layers are provided and can be easily redesigned for future models or options without additional tooling costs.

Figure 7:
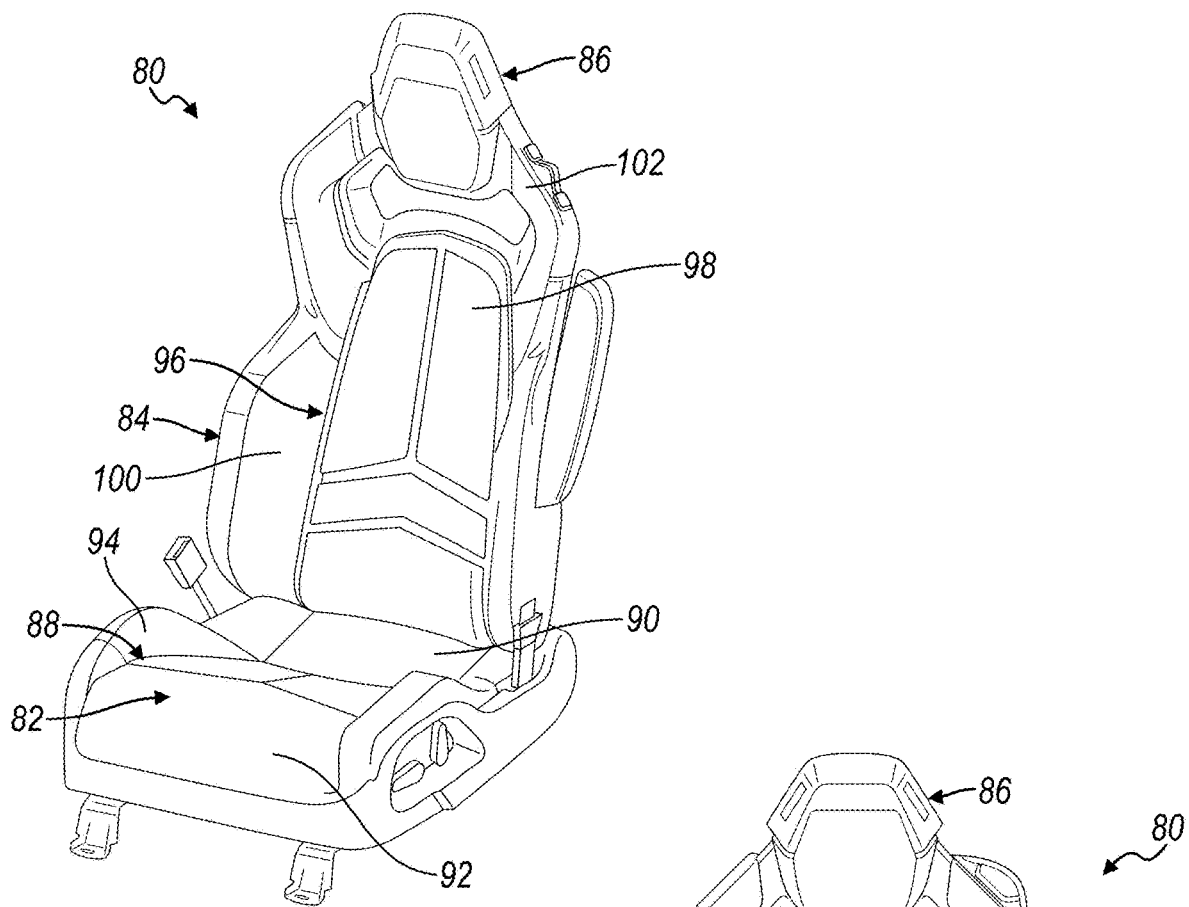
FIG. 7 is a perspective view of a seat assembly according to another embodiment.
Figure 8:
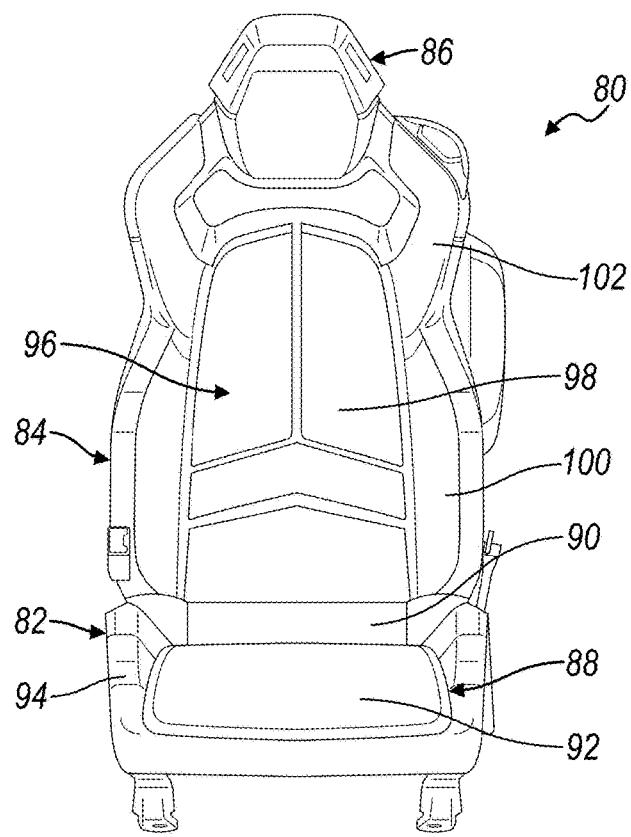
FIG. 8 is a front elevation view of the seat assembly of FIG. 7.

FIGS. 7 and 8 illustrate a seat assembly 80 according to another embodiment. Similar to the prior embodiment, the seat assembly 80 includes a seat bottom 82, a seat back 84 and a head restraint 86. The seat bottom 82 includes a seat bottom support 88 formed from a plurality of zones. For example, the seat bottom 82 may include an insert 90 oriented centrally at a rear of the seat bottom 82 and sized to receive the pelvis of the occupant. A nose 92 is oriented forward of the insert 90 and is sized to support the occupant's thighs. A pair of bolsters 94 are each oriented laterally outboard of the insert 90 and the nose 92 to provide lateral support and comfort to the pelvis and thighs.

Each zone 90, 92, 94 of the seat bottom support 88 is formed from a plurality of stacked layers so that the zones vary in thickness and firmness. According to one embodiment the seat bottom support 88 is formed from four separate material sheets that vary in firmness, from firm, semi-firm, semi-soft, and soft. Each of these zones may be constructed from multiple layers of the material sheets. For example, the insert 90 may formed from the bottom to the top with five layers in sequence: firm, firm, semi-soft, semi-soft and soft. The nose 92 supports less weight and is provided from five layers in sequence: semi-firm, semi-soft, soft, soft, and soft. The bolsters 94 are a little more rigid and are stacked in sequence from the bottom: firm, firm, semi-firm, semi-soft, and semi-soft. Each zone 90, 92, 94 is somewhat rigid at the base to provide support and softens near the surface to provide comfort. The zones 90, 92, 94 vary in construction to provide a target comfort profile based on the estimated pressure distribution. The construction of the zones 90, 92, 94 is by way of example to illustrate how a targeted comfort profile can be provided with a variety of four material layers, stacked in a quantity of up to five layers. Any quantity of layers may be employed within any zone to obtain the targeted support and comfort profile.

The seat back 84 includes a seat back support 96. The seat back support 96 includes a plurality of zones. For example, a seat back insert 98 supports lumbar and thoracic regions of the back of the occupant. A pair of seat back bolsters 100 are spaced apart laterally about the insert 98 to provide lateral support to the occupant's back. A pair of shoulder zones 102 are provided above the bolsters 100 and extend from lateral sides of the insert 98 to the head restraint 86.

The seat back 84 supports lighter loads than the seat bottom 82. According to an embodiment, the seat back support 96 is formed from various combinations of the four material layers that are utilized for the seat bottom support 88. The insert 98 is provided from five layers from back to front in sequence: semi-firm, semi-firm, semi-firm, semi-firm and semi-soft. The bolsters 100 are thinner and are provided by four layers in sequence from rear to front: semi-firm, semi-firm, semi-firm, and semi-soft. The shoulders 102 are provided with one layer, semi-soft. The comfort profile can also vary based on the quantity of material layers as exemplified by the seat back support 96.

Figure 9:
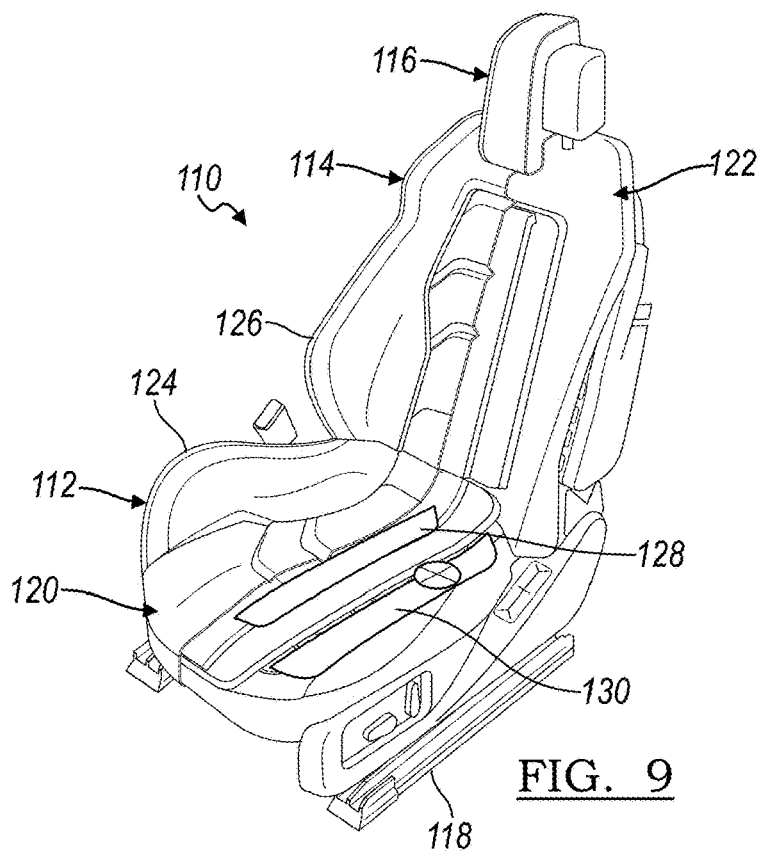
FIG. 9 is a perspective partial section view of a seat assembly according to another embodiment.

FIG. 9 depicts a seat assembly 110 according to another embodiment. The seat assembly 110 includes a seat bottom 112, a seat back 114, and a head restraint 116. The seat assembly 110 includes rails 118 for connection to a vehicle floor. The seat bottom 112 includes a seat bottom support 120 formed from multiple layers of the monofilament textile as described above in prior embodiments. Likewise, the seat back 114 includes a seat back support 122 also formed from multiple non-foam layers. A trim cover 124 is provided over the seat bottom 112. A seat back trim cover 126 is provided over the seat back 114. A heater 128 is provided between layers in the seat bottom support 120. A cooling layer 130 is also provided with the seat bottom support 120.

Figure 10:
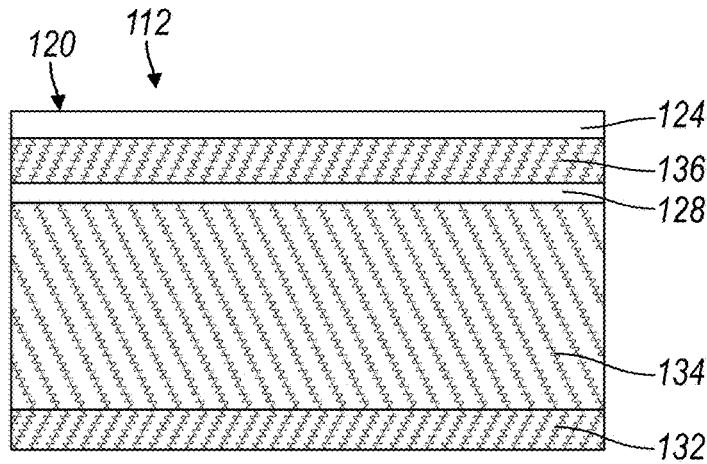
FIG. 10 is a section view of a portion of the seat assembly of FIG. 9.

FIG. 10 is a partial section view of the seat bottom support 120 through the heater 128. The seat bottom 112 includes a seat bottom carrier 132. The seat bottom carrier 132 may be provided with vents to permit ventilation through and underneath the seat bottom 112. A plurality of layers 134 of the monofilament material are provided on the carrier 132. The heater 128 is provided upon the layers 134. The porosity of the monofilament textile material 134 permits ventilation through the layers 134. Therefore, additional ducting or a ventilation distribution bag are omitted in contrast to the prior art.

Another monofilament textile layer 136 is provided on top of the layers 134 with the heater 128 therebetween. The upper layer 136 may permit heat to pass therethrough to conduct and convey heat through the upper layer 136 to the trim cover 124. The upper layer 136 may be formed with a thermally conductive yarn to conduct heat from the heater 128 to the trim cover 124. The conductive yarn may include a thermally conductive carbon fiber. One of the layers 134, 136 beneath or above the heater 128 may be formed with a conductive thread to convey electricity to the heater 128. Townley et al. U.S. Pat. No. 10,882,444 B2 issued to Lear Corporation on Jan. 5, 2021 and discloses a textile with a conductive element, which is incorporated in its entirety by reference herein.

Figure 11:
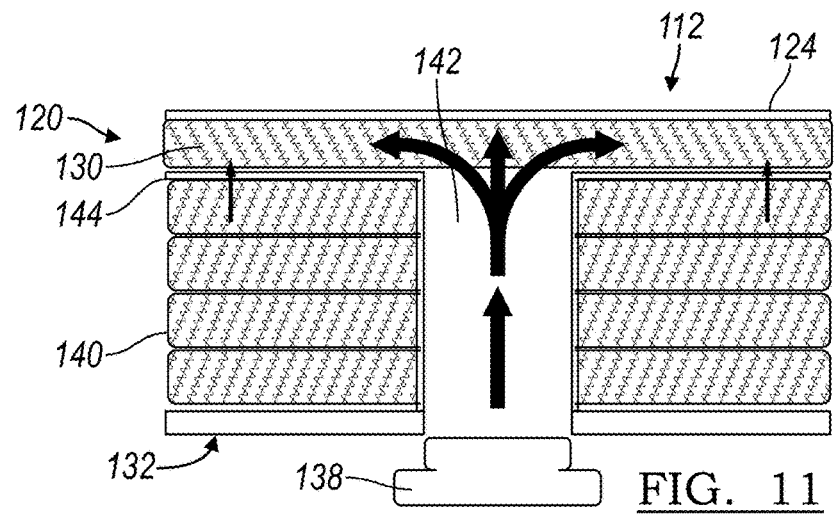
FIG. 11 is a section view of another portion of the seat assembly of FIG. 9.

FIG. 11 illustrates a partial section view of the seat bottom support 120 through the cooling layer 130 according to an embodiment. A cooling assembly 138 is attached to the carrier 132. The cooling assembly 138 includes a blower fan as is known in the art. The cooling assembly 138 may also include a thermoelectric device, which includes a module for cooling the forced air. A plurality of layers 140 are provided on the substrate 132, between the substrate 132 and the cooling layer 130. A port 142 is formed through the layers 140 to direct the forced air through the layers 140. The port 142 is sealed to prevent the forced air from indirectly passing through the intermediate layers 140.

The forced air is conveyed to the cooling layer 130. Due to the porosity of monofilament layer 130, the forced air disperses through the monofilament layer 130 to cool the trim cover 124. A seal 144 is also provided between the cooling layer 130 and the adjacent intermediate layer 140 to prevent the cooled air from passing into the intermediate layers 140. The seals 144 direct the air and mitigate airflow loss. The seals 144 may also be formed of a polyester material for recycling with the seat bottom 112. The monofilament layers permit improved thermal comfort and energy efficiency in the seat assembly 110.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat support, comprising a plurality of layers of a non-foam material mounted to a seat frame and to support an occupant upon the seat frame, wherein the plurality of layers is stacked upon each other, and each of the plurality of layers has a generally uniform thickness, and wherein a sealed ventilation port is formed through at least one of the plurality of layers and a region between a sequential pair of the plurality of layers is sealed so that ventilation is directed through one of the sequential pair of the plurality of layers.

2. The seat support of claim 1, wherein one of the plurality of layers has a first firmness, and
   wherein another of the plurality of layers has a second firmness that differs from the first firmness.

3. The seat support of claim 1, wherein one of the plurality of layers has a first thickness, and wherein another of the plurality of layers has a second thickness that differs from the first thickness.

4. The seat support of claim 1, further comprising a plurality of zones, wherein at least two zones of the plurality of zones vary in thickness, firmness, or a quantity of stacked layers.

5. The seat support of claim 4, wherein the plurality of zones further comprises a nose, an insert, and a pair of bolsters on opposed lateral sides of the nose, and, wherein the insert supports the occupant.

6. The seat support of claim 4, wherein the plurality of zones further comprises an insert, a pair of bolsters on opposed lateral sides of the insert, and a pair of shoulders on opposed lateral sides of the insert to support a seat back.

7. The seat support of claim 1, wherein each of the plurality of layers is formed from a monofilament textile material.

8. The seat support of claim 7, wherein at least one of the plurality of layers is formed from a recycled material.

9. The seat support of claim 7, wherein at least one of the plurality of layers is formed from polyester.

10. The seat support of claim 7, further comprising one of a heater mat or a blower.

11. The seat support of claim 7, further comprising a conductive yarn within the one of the plurality of layers of the monofilament textile material.

12. The seat support of claim 11, further comprising a heater mat oriented between two of the plurality of layers, wherein the heater mat is in electrical communication with the conductive yarn.

13. The seat support of claim 7, wherein each sequential pair of the plurality of layers are one of welded or sewn together.

14. A seat support assembly, comprising:
    the seat support of claim 7, wherein each of the plurality of layers is formed from the non-foam monofilament textile material mounted to a seat frame and to support an occupant upon the seat frame; and
    a heater mat or a blower, wherein the non-foam monofilament textile material permits ventilation without an air distribution bag.

15. The seat support of claim 1, further comprising an adhesive provided between each sequential pair of the plurality of layers to adhere sequential layers together, wherein the adhesive is formed from a similar recyclable material as the plurality of layers.

16. The seat support of claim 1, wherein the uniform thickness of the plurality of layers is within a range of 6 mm to 15 mm.

17. The seat support of claim 1, further comprising a trim cover mounted on a plurality of layers, wherein the trim cover is formed from a similar recyclable material as the plurality of layers.

18. A method for manufacturing a seat assembly, comprising:
    cutting a seat support portion from a sheet of non-foam monofilament material;
    installing the seat support portion upon a substrate of a non-foam material; and
    installing a trim cover over the seat support portion.

19. The method of claim 18, further comprising unrolling the sheet of non-foam monofilament material before cutting the seat support portion.

20. The method of claim 18, wherein the seat support portion is cut from the sheet of non-foam monofilament material using one of a laser or a robotic tooling.

* * * * *